ULTRAHIGH FREQUENCY FILTER

Filed Aug. 7, 1951

INVENTORS
ERVIN M. BRADBURD
ROBERT S. ALTER
THOMAS M. MAXWELL, Jr.

BY Percy P. Lantzy
ATTORNEY

United States Patent Office 2,762,017

Patented Sept. 4, 1956

2,762,017

ULTRAHIGH FREQUENCY FILTER

Ervin M. Bradburd, Fairlawn, and Robert S. Alter and Thomas M. Maxwell, Jr., Clifton, N. J., assignors to International Telephone and Telegraph Corporation, a corporation of Maryland Application August 7, 1951, Serial No. 240,696

4 Claims. (Cl. 333—9)

This invention relates to ultra high frequency filters and more particularly to a constant resistance type of filter.

In transmitters such as are employed for television and other purposes, filters are necessary to assure compliance of the transmitter output signal with Federal Communications Commission and Radio Manufacturers' Association specifications. Ideally, for television, this spectrum would show no attenuation referred to the 200 kc. side band from a frequency of 0.75 mc. below the carrier frequency to 4 mc. above the carrier frequency, and at all frequencies greater than 1.25 mc. below carrier frequency, the attenuation must be a minimum of 20 db. There has been developed, heretofore, a sideband filter of the constant resistance type using an impedance in series with the R. F. load and an impedance in series with the auxiliary load for absorbing unwanted energy. These two impedances, however, are usually not identical, and this is objectionable. It is also objectionable to use reactive impedances in series with the R. F. load and the auxiliary load because of the difficulties in constructing the circuits required to handle the high power involved. In addition, it is not only desirable to have the two impedances identical but also to have the R. F. load equal to the auxiliary load.

One of the objects of this invention, therefore, is to provide an ultra high frequency filter of the constant resistance type which overcomes the aforementioned objections and which fully satisfies the specifications of the Federal Communications Commission and Radio Manufacturers' Association.

Another object is to provide a constant resistance type of filter having substantially equal impedances, high current carrying capacity and wherein an auxiliary load is provided for absorbing unwanted energy, which is equal substantially to the R. F. load with which the filter is associated.

A further object of this invention is to provide a constant resistance type of filter that contains substantially no reactive impedance effects.

Still another object of the invention is to provide a constant resistance type of filter of coaxial form which is rugged and relatively simple to build.

An important feature of this invention is the provision for use in television transmitters of a constant resistance notched type sideband filter wherein the two impedances are transformed through quarter wavelength matching sections so that they provide equal effect with respect to the transmission line coupling the source of R. F. energy to the antenna load.

Briefly, a filter according to the invention may comprise a pair of resonator units of substantially equal impedance which are coupled through matching sections to a transmission line connecting the source of R. F. energy to the antenna load. The matching sections are connected to the line at points spaced apart substantially one-quarter wavelength of the frequency of the energy to be passed. An auxiliary load selected substantially equal to the antenna load is coupled across one of the resonators. Each resonator is preferably of a coaxial construction and the matching section is coupled thereto by means of an inductive loop disposed in coupling relation with respect to the resonator cavity or the inner conductor of the resonator. Two or more filter sections, each comprising a pair of such resonators, may be coupled in cascade arrangement to the transmission line to provide the desired pass band.

The above mentioned and other features and objects of this invention will become more apparent by reference to the following description taken in conjunction with the accompanying drawings, wherein.

Figure 3:
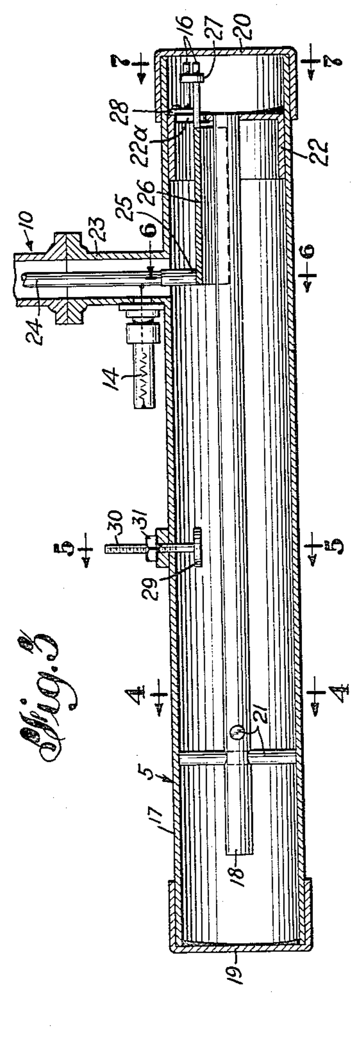
Figure 7:
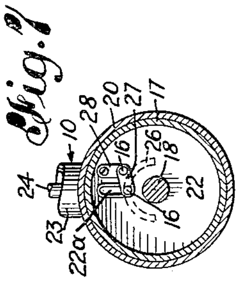
Figure 6:
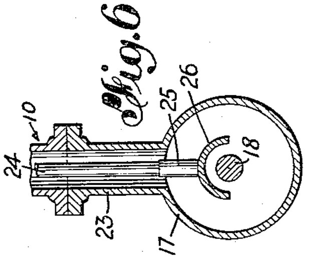
Figure 5:
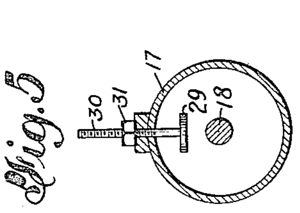
Figure 4:
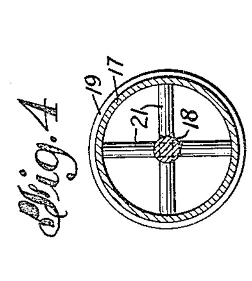

Fig. 3 is a longitudinal cross sectional view of the left-hand unit of one of the filter sections; and Figs. 4, 5, 6 and 7 are cross-sectional views taken respectively along lines 4—4, 5—5, 6—6, and 7—7 of Fig. 3.

Figure 1:
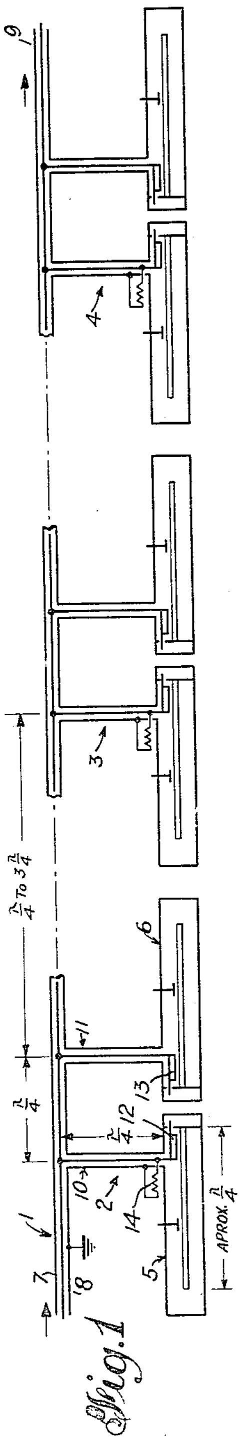
Fig. 1 is a diagrammatic illustration of a plurality of filter sections constructed and connected in cascade arrangement in accordance with the principles of this invention.

Referring to Fig. 1 of the drawing, a filter system 1 is illustrated showing a plurality of filter sections 2, 3, and 4 connected together in cascade arrangement. While one filter section is quite suitable for many purposes, it is preferred to provide three such sections in cascade arrangement to meet fully the requirements of the Federal Communications Commission and the Radio Manufacturers' Association specifications. Each section is substantially identical and comprises two cavity resonators 5 and 6. The two resonators are coupled to a transmission line 7 which is adapted for connection to a source of radio frequency energy at one end 8 and an antenna load at the other end 9. The resonators 5 and 6 are coupled by means of matching line sections 10 and 11, each of the length equal substantially to one-quarter wavelength of the frequency of the energy to be passed, the line sections being coupled to the transmission line 7 at points spaced therealong, the spacing being also equal substantially to one-quarter wavelength. The spacing between adjacent sections 2, 3, and 4 along the transmission line 7 should preferably be a quarter wavelength, although the spacing may approach three-quarter wavelength at high frequencies. The line sections 10 and 11 are coupled to the resonators 5 and 6 through inductive loops 12 and 13. An auxiliary load 14 is coupled across one of the resonators of each filter section.

Figure 2:
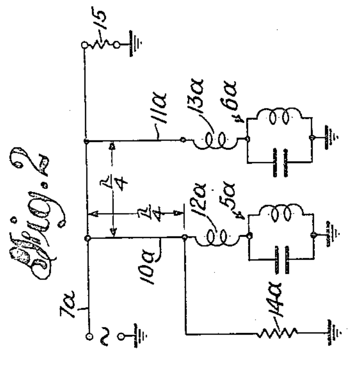
Fig. 2 shows an equivalent circuit diagram of one of the filter sections shown in Fig. 1.

Referring to Fig. 2, which shows an equivalent circuit for one of the filter sections, the resonators 5 and 6 are indicated as resonant circuits **5*a* and 6*a* and the line sections 10 and 11 are represented by conductors 10*a* and 11*a*, respectively, coupling the circuits 5*a* and 6*a* to transmission line 7*a*. The coupling inductances 12*a* and 13*a* correspond to the inductance loops 12 and 13 of Fig. 1. The load 14*a* corresponds to the auxiliary load 14, and the load 15 corresponds to the antenna load to be associated with the transmission line at the output connection 9**.

From the equivalent circuit of Fig. 2, it will be clear that the resonant circuits **5*a* and 6*a* are not connected directly in series between the source of power and the load, but instead, the impedances of the two circuits are transformed through one-quarter wavelength matching sections 10*a* and 11*a* to spaced points along the transmission line 7*a*. The impedances of these two circuits are identical insofar as the line 7*a*** is concerned. The attenuation of such a filter may be represented by $$\frac{P_{out}}{P_{in}}=\frac{A}{A+\frac{(1+2\epsilon)(1-K\epsilon)^2}{4\epsilon^2}}$$

where $$A=\frac{R_L^2}{L^2\omega_0^2}$$

$R_L$=antenna load
$L$=resonator inductance $$K=\frac{1}{\frac{\omega_1}{\omega_0}-1}$$

$$\epsilon=\frac{\omega}{\omega_0}-1$$

$\omega_1$=frequency of full pass of the network
$\omega_0$=frequency of full attenuation of the network-frequency parameter.

When the requirements are set for A and K in a filter of this type for the relatively broad band of attenuation required, it is found that it is not practical to construct transmission lines of the inductances and capacitances required because the characteristic impedance for these transmission lines would be too great. This is overcome by the present invention by constructing cavity resonators one-quarter wavelength long with a configuration of optimum Q and then inductively coupling into these resonators. By this method the low inductances and high capacitances required are obtained without introducing high lossy structures into the transmission line. Furthermore, the impedance of inductances **12*a* and 13*a* are obtained by the inductance of the cavity coupling loop 12 and a small section of shorted parallel lines 16**, Fig. 3, external to the cavity. The impedance reflected by the cavity into the coupling loop is a function of the total energy storage of the cavity to that stored in the region intercepted by the coupling loop.

By reference to Figs. 3, 4, 5, 6, and 7, a further understanding of the details of the filter may be had. The resonator 5 is shown to comprise an outer conductive cylinder 17 and an inner conductor 18 disposed coaxially therein. The cylinder 17 may be open at its ends but preferably is closed by end pieces 19 and 20. If desired, the dielectric between conductors 17 and 18 may be other than air, for example, it may be a gas or liquid or even a solid dielectric such as polyethylene. The conductor 18 is supported by dielectric spacers 21 adjacent one end thereof and a conductive end plate 22 carried by the cylinder 17. The coaxial portion of the conductors 17 and 18 is preferably the electrical equivalent of a quarter wave of the ratio frequency energy to be passed. The cylinder 17 preferably extends beyond the ends of the inner conductor 18 to minimize end effects. The matching line section 10 comprises a coaxial line having an outer conductor 23 and inner conductor 24. The outer conductor 23 is connected directly to the cylinder 17. The inner conductor 24 is connected, through a flexible or telescoping sliding joint 25, to an inductive loop 26 which is arcuate in cross section and disposed substantially parallel to the inner conductor 18. The loop 26 has an extension through an insulated opening **22*a* in the end plate 22 as one of the lines of the external parallel lines 16. These lines 16 are adjustably shorted together by a link 27 and further connected to end plate 22 through a second link 28 which is pivotally supported on the end plate. By manipulating the parallel line section 16 about the pivot of the link 28, the spacing, and thereby the degree of coupling, between the loop 26 and the inner conductor 18** of the resonator may be varied.

A capacity element 29 is provided disposed inwardly of the cylinder 17 which may be adjusted relative to the conductor 18 as indicated by the threaded shank 30 and nut 31. By this means the electrical length of the resonator may be adjusted.

The auxiliary load 14 is coupled across the resonator by connecting it between the outer conductor 23 and inner conductor 24 of the matching line section 10 adjacent the coupling loop 26.

The filter herein disclosed may be used in a television transmitter by placing it in the transmission line between the power amplifier and the antenna system. The input impedance of the filter is practically constant for both the pass and rejected frequency bands, while the reactance remains essentially zero.

While we have described above the principles of our invention in connection with specific apparatus, it is to be clearly understood that this description is made only by way of example and not as a limitation to the scope of our invention, as set forth in the objects thereof and in the accompanying claims.

We claim:

1. A filter network comprising an input connection for coupling said network to a source of modulated radio-frequency energy, an output connection for coupling said network to a load, a transmission line coupling together said input and output connections, a first passive resonator unit of a predetermined frequency dependency having at least an inner and outer conductor, a second passive resonator unit of a predetermined frequency dependency substantially equal to that of said first resonator unit and having at least an inner and outer conductor, means including inductive coupling means having an arcuate conductive element partially surrounding the inner conductor of the resonator unit for coupling said first and second units as impedances to said transmission line, means to adjust the conductive element of said inductive coupling means radially of said cavity and an auxiliary load coupled across one of said units equal substantially to the load coupled to said output connections.

2. A filter network comprising a coaxial line input connection for coupling to a source of radio-frequency energy having a mean frequency, a coaxial line output connection for coupling to a load, a coaxial transmission line having an inner and outer conductor coupling together said input and output connections, an even number of passive cavity resonator units having substantially identical frequency dependent characteristics and of substantially identical construction including an outer conductor and an unbroken inner conductor connected at one end only to said outer conductor and disposed coaxially thereof, the coaxial conductor portion of said resonators being substantially the electrical equivalent of one-quarter wavelength at said mean frequency, a plurality of coaxial line sections each having an inner and outer conductor of substantially one-quarter wavelength at said mean frequency, the inner conductor of said coaxial line sections being coupled to the inner conductor of said transmission line at points spaced therealong at a distance substantially equal to one-quarter wavelength at said mean frequency, means connecting the outer conductors of said coaxial line sections to the outer conductors of said cavity resonator units, an inductive coupling means including an arcuate conductive element disposed parallel to and partially surrounding the inner conductor of the resonator unit having one end connected to the inner conductor of said coaxial line sections, and means for adjusting the spacing between said arcuate conductive element and the inner conductor of said resonator.

3. In a filter network, a passive cavity resonator unit comprising an outer cylindrical conductor, an unbroken inner conductor disposed coaxially of said cylindrical conductor and connected thereto at one end, the length of the coaxial portion of said resonator being substantially the electrical equivalent of one-quarter wavelength at a mean frequency to be passed by said filter, a coaxial transmission line having an inner and outer conductor, means coupling said coaxial transmission line to said passive cavity resonator unit including an inductive loop, arcuate in cross section, connected at one end thereof to the inner conductor of said coaxial transmission line and coupled at the other end thereof through a conductive path to said outer cylindrical conductor, means for adjusting the length of the conductive path between said inductive loop and said outer cylindrical conductor, said arcuate inductive loop being disposed in spaced parallel relation and coaxial with the inner conductor of said resonator, and means for adjusting the radial position of said arcuate conductor relative to the inner conductor of said resonator.

4. In a filter network, a passive cavity resonator unit comprising an outer cylindrical conductor, a first end plate terminating one end of said outer cylindrical conductor, a second end plate disposed within said outer conductor and spaced from said first end plate to form a cylindrical cavity having an axial length less than the length of said outer conductor, an unbroken inner conductor disposed coaxially of said cylindrical outer conductor and coupled to said second end plate, the length of the coaxial portion of said resonator unit being substantially the electrical equivalent of one-quarter wavelength at a mean frequency to be passed by said filter, a coaxial transmission line section having an inner and outer conductor, means coupling the outer conductor of said section to said outer cylindrical conductor, means coupling energy between said cavity resonator unit and said coaxial transmission line section including a sliding conductive joint coupled in the inner conductor of said transmission line section, an inductive loop arcuate in cross section and disposed partially surrounding the inner conductor of said cavity resonator unit, means coupling one end of said loop to the inner conductor of said transmission line section, a first conductive line coupled to the other end of said loop and having a portion passing through said second end plate external to said cavity, a second conductive line coupled to said second end plate and disposed parallel to said first conductive line, conductive pivoting means adjustably shorting together said first and second conductive lines whereby the radial position of said inductive loop relative to the inner conductor of said resonator unit is adjustable to vary the amount of energy coupled between said transmission line section and said resonator unit.

References Cited in the file of this patent

UNITED STATES PATENTS

| | | |
|---|---|---|
| 2,214,041 | Brown | Sept. 10, 1940 |
| 2,395,441 | Alford | Feb. 26, 1946 |
| 2,410,656 | Herold | Nov. 5, 1946 |
| 2,423,416 | Sontheimer et al. | July 1, 1947 |
| 2,506,132 | Brown | May 2, 1950 |
| 2,527,549 | Herring | Oct. 31, 1950 |
| 2,547,637 | Gardiner et al. | Apr. 3, 1951 |
| 2,555,154 | Raymond | May 29, 1951 |
| 2,570,579 | Masters | Oct. 9, 1951 |
| 2,600,949 | Wolf | June 17, 1952 |
| 2,603,754 | Hansen | July 15, 1952 |
| 2,611,079 | Varela et al. | Sept. 16, 1952 |
| 2,661,424 | Goldstein | Dec. 1, 1953 |